Feb. 23, 1965 T. F. PETERS 3,170,332
REMOTE CONTROL MIRROR
Filed Nov. 8, 1961 2 Sheets-Sheet 1

INVENTOR.
Theodore F. Peters
BY
Paul J. Reising
ATTORNEY

United States Patent Office 3,170,332
Patented Feb. 23, 1965

3,170,332
REMOTE CONTROL MIRROR
Theodore F. Peters, Dearborn, Mich., assignor to General Motors Corporation, Detroit, Mich., a corporation of Delaware
Filed Nov. 8, 1961, Ser. No. 151,100
11 Claims. (Cl. 74—54)

This invention relates to a rear view mirror that may be mounted exteriorly on an automotive vehicle and adjusted to any desired angular position.

An object of this invention is to provide a remotely controlled mirror having an improved operating mechanism of durable construction that provides a positive driving connection between the mirror and the actuator.

Another object of this invention is to provide a mirror that is adjustable about mutually perpendicular first and second pivot axis by a single cable connected to a remotely located actuator, and is operatively connected with mechanism that provides a pivotal movement of the mirror about the first or second axis when the actuator is respectively rotated in one direction or in an opposite direction.

These and other objects are accomplished in accordance with the invention by the provision of a mirror pivotally mounted on a mounting bracket that is secured exteriorly of the vehicle. Pivotal movement of the mirror about one axis is provided by an eccentrically mounted cam rotatably driven by a drive shaft through a clutching mechanism that only directs drive to the cam when the shaft is rotated in one direction. The drive shaft is coupled to the clutching mechanism and has a cam surface integrally formed with the shaft for cooperation with a cam follower that is interposed between the cam surface and eccentric cam member so as to provide pivotal movement of the mirror structure at a second pivot axis when the drive shaft is rotated in a direction opposite to the first direction. A wire or cable connects the shaft with a remotely disposed actuator which includes a knob for rotating the wire and associated shaft about its longitudinal axis to realize selective adjustment of the mirror structure about the first or second axis.

A better understanding of the subject invention will be derived from a perusal of the detailed description taken in conjunction with the drawings, in which.

Figure 1:
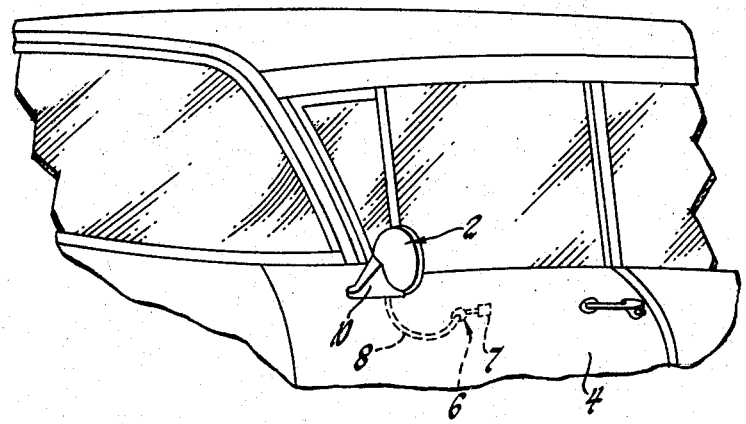
FIGURE 1 shows the subject rear view mirror structure incorporated with a vehicle door.
Figure 2:
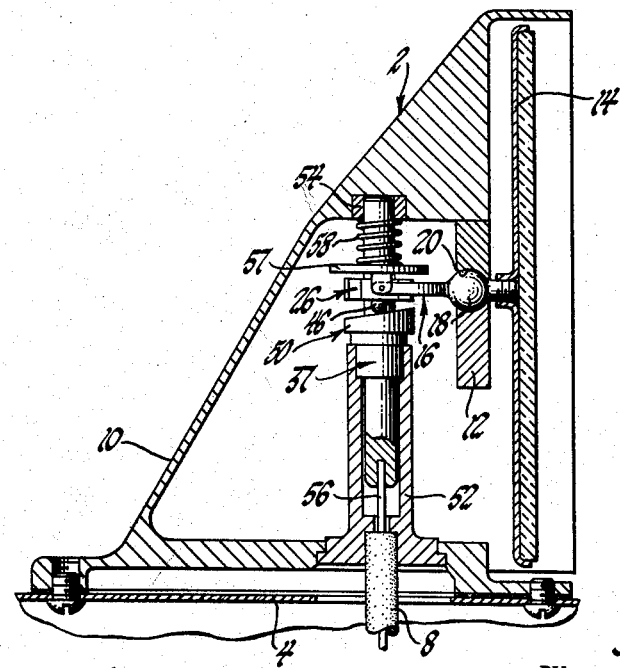
FIGURE 2 is an enlarged sectional view of the mirror structure disclosing the operating components thereof.
Figure 5:
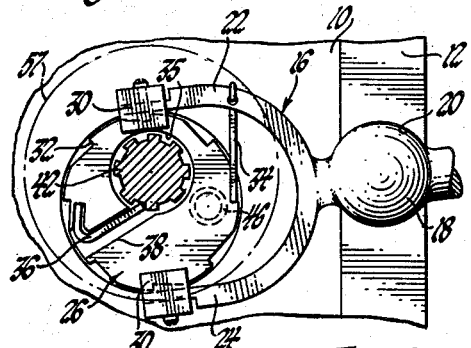
FIGURE 5 is a section taken on lines 5—5 of FIGURE 3.

Referring now to FIGURE 1 of the drawings, a mirror structure 2 is shown fixedly mounted on the exterior portion of a vehicle door 4 and is operatively connected with an actuator 6 through a wire or cable 8 such as a Bowden wire having the conventional sheath portion with a wire extending therethrough. As seen in FIGURE 2, the mirror structure 2 includes a mounting bracket 10 that is supported by the door 4 and is opened at one end with a vertical boss or collar 12 integrally formed therewith. A mirror support 14 is secured to a yoke member 16 which includes a ball portion 18 universally supported by a spherical bearing surface 20 formed in the collar 12 for pivotal movement of the yoke about mutually perpendicular axes. As viewed in FIGURES 3 and 5, the yoke member includes a pair of spaced arms 22 and 24 with the inner portions thereof disposed adjacent the peripheral surface of an eccentric cam 26. Each arm of the yoke member is pivotally connected to an inwardly projecting tongue 30 that overlaps a portion of the cam 26 so as to support the yoke member during the operation of the mechanism as will hereinafter be explained.

Figure 7:
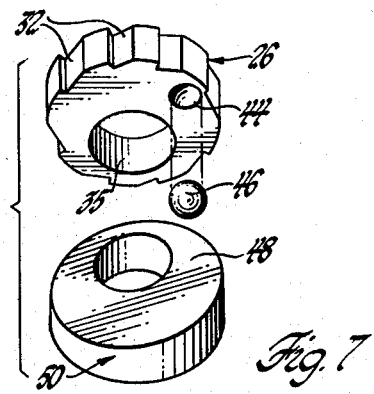
FIGURE 7 is a perspective view illustrating the several cam members incorporated with the subject invention.

Referring now to FIGURE 7, the cam 26 includes a plurality of ramp and riser portions 32 formed on the periphery thereof, each of which is adapted to coact with one end of a resilient tooth 34 which is connected to arm 22 of the yoke member. As viewed in FIGURE 5, the tooth 34 engages the riser surface and thereby prevents counter-clockwise rotation of the cam 26, however, clockwise rotation of the cam is permitted because of the tooth over-riding the riser portion 32. An enlarged bore 35 is eccentrically formed in the cam and serves to accommodate a drive shaft 37 having a splined portion 42. A second resilient tooth 36 is carried by a radial slot 38 formed in the cam 26 with the free end of the tooth extending into the bore 35 and engageable with the teeth of the splined portion 42. With this arrangement, rotation of the shaft 37 in a clockwise direction results in drive being transmitted to the cam 26 through the tooth 36 while the tooth 34 overrides the cam riser portions as aforedescribed. The lower surface of the cam 26 has a spherical depression 44 located adjacent the periphery of the cam for accommodating a cam follower or ball 46 which is adapted to ride on an inclined camming surface 48 formed on one surface of an annular member 50 that is rigidly connected with the drive shaft 37.

The shaft 37 is vertically supported at one end by an elongated plug 52 mounted in the lower portion of the bracket 10 while the other end of the shaft 37 is mounted within a bushing 54 press fitted in the upper portion of the bracket. The bushing and plug permit the shaft to rotate about its longitudinal axis when driven by a wire 56, the free end of which is connected with a rotatable knob 7 incorporated with the actuator 6. A washer 57 is seated on the tongues 30 formed on the yoke arms with a coil spring 58 mounted on the shaft and interposed between the washer and bushing, for exerting a continuous force in a downward direction against the cam 26 so as to maintain the cam follower 46 in contact with the camming surface 48 and, in addition, so as to prevent repositioning of the mirror due to rattles or vibrations.

Figure 6:
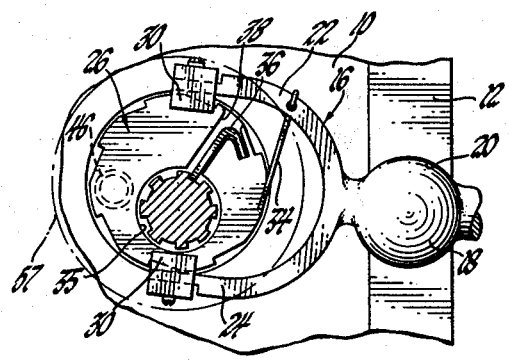
FIGURE 6 is similar to FIGURE 5 with parts repositioned.

During operation, rotation of the actuator knob 7 results in a corresponding rotation of the wire 56 and the drive shaft 37. Assuming the shaft 37 is rotated in a clockwise direction as viewed in FIGURE 5, the teeth of the splined portion 42 engage the tooth 36, causing a clockwise drive to be transmitted to the eccentric cam 26. During the clockwise movement of the cam, the yoke tooth 34 overrides the riser portion 32 formed on the peripheral surface of the cam 26 thereby permitting the cam to rotate about its axis to the position shown in FIGURE 6, and further to the original position of FIGURE 5 upon continued clockwise movement. Also, because of the rigid connection between the annular member 50 and the shaft, the former rotates with the shaft and cam 26 with the result that the cam 26 maintains a fixed position in a horizontal plane and the rotation of the cam 26 moves the mirror support 14 through the yoke 16 sidewise about a vertical pivot axis.

Figure 3:
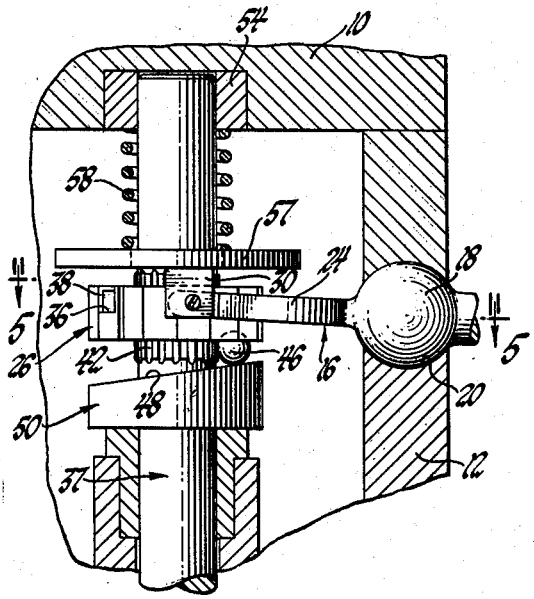
FIGURE 3 is an enlarged view of the operating components shown in FIGURE 2.
Figure 4:
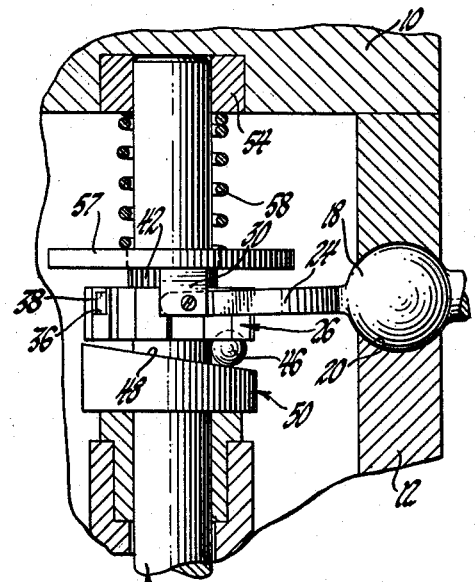
FIGURE 4 is similar to FIGURE 3 with portions of the mechanism repositioned.

When the actuator knob 7 is rotated in the opposite direction so as to drive the shaft in a counterclockwise direction, a free-wheeling of the shaft with respect to the cam 26 occurs. In this instance, the teeth of the splined portion 42 rotate without drivingly engaging the tooth 36 due to the blocking engagement of the tooth 34 with the riser surface of the cam 26. Thus, the cam 26 does not rotate, however, the annular member 50 being rigid with the shaft is subjected to counterclockwise rotation causing the inclined camming surface 48 to rotate with respect to the cam 26 and the cam follower 46. Assuming the components are positioned as shown in FIGURE 3 and the shaft 37 is rotated 180° in a counterclockwise direction, a corresponding rotation of the annular member occurs so as to move the high portion of the camming surface 48 from contact with the ball 46 and dispose the lower portion of the camming surface 48 in contact with the ball as shown in FIGURE 4. This results in the cam follower and cam 26 moving vertically downwardly along the shaft under the influence of the spring 58 with corresponding downward movement of the yoke arms so as to pivot the mirror structure 14 about a second pivot axis. Continued counterclockwise rotation of the drive shaft returns the cam 50 to the position of FIGURE 3. It is apparent then that for selective positioning of the mirror structure about a first or second pivot axis, the actuator knob is rotated in one direction or the other thereby providing appropriate adjustment of the mirror assembly.

Having disclosed a preferred embodiment for purposes of illustration, it is to be understood that the invention is not to be limited thereby but only by the following claims.

What is claimed is:

1. A remotely controlled mirror mechanism comprising a mounting bracket, a mirror support, first means supporting said mirror support and connected to said mounting bracket for movement about mutually perpendicular first and second axes, a first cam operatively connected with said means, drive means, means coupling said drive means to said first cam so that rotation of said drive means in one direction turns said first cam to pivot said mirror support solely about the first pivot axis, a second cam formed with the drive means, and means including said first cam for coacting with the second cam so that rotation of said drive means in an opposite direction pivots said mirror support solely about the second pivot axis.

2. A remotely controlled mirror mechanism comprising a mounting bracket, a mirror support, a yoke member connected to said mirror support and having a ball portion, said ball portion connected to said bracket for supporting said mirror support about mutually perpendicular first and second axes, a first cam operatively connected with said yoke member, drive means, means coupling said drive means to said first cam so that rotation of said drive means in one direction turns said first cam to pivot said ball portion and mirror support solely about a first pivot axis, a second cam formed with the drive means, and means including said first cam for coacting with the second cam so that rotation of said drive means in an opposite direction pivots said ball portion and mirror support solely about the second pivot axis.

3. A remotely controlled mirror mechanism comprising a mounting bracket, a mirror support, means supporting said mirror support and connected to said mounting bracket for movement about mutually perpendicular first and second axes, an eccentric cam operatively connected with said means, drive means, means coupling said drive means to said eccentric cam so that rotation of said drive means in one direction turns said cam to pivot said mirror support solely about a first pivot axis, and a cam surface formed with said drive means, a cam follower connected to said eccentric cam for cooperation with said cam surface so that rotation of said drive means in an opposite direction causes said mirror support to pivot solely about the second axis.

4. The device of claim 3 wherein said cam follower includes a ball rotatably supported by said eccentric cam.

5. A remotely controlled mirror mechanism comprising a mounting bracket, a mirror support, means supporting said mirror support and connected to said mounting bracket for movement about mutually perpendicular first and second axes, a first cam operatively connected with said means and having a resilient tooth, drive means coupled to said cam and having teeth formed thereon for engagement with said resilient tooth so that rotation of said drive means in one direction turns said cam through the resilient tooth to pivot said mirror support solely about the first pivot axis, means to restrain said cam form rotative movement in an opposite direction, a cam follower mounted on said first cam, a camming surface rigidly formed with said drive means for cooperation with the cam follower so that rotation of said drive means in said opposite direction pivots said mirror support solely about the second pivot axis.

6. The mechanism of claim 5 wherein the restraining means is connected to said means supporting said mirror support on the mounting bracket, and said first cam has a plurality of ramp and riser portions formed thereon for cooperation with the restraining means.

7. The mechanism of claim 5 wherein a spring continuously urges the first cam towards the camming surface whereby said cam follower maintains contact with the camming surface during rotation of the drive means.

8. A remotely controlled mirror mechanism comprising a mounting bracket, a yoke member having a ball portion pivotally supported by said mounting bracket, a mirror support rigidly mounted to said yoke member, an eccentric cam engageable with said yoke member to move said mirror support about mutually perpendicular first and second pivot axes, a resilient tooth connected to the eccentric cam, a drive shaft supporting said eccentric cam for movement along said shaft, means formed on said shaft for engagement with said resilient tooth, stop means carried by the yoke member and engageable with the eccentric cam to prevent rotative movement of said eccentric cam in one direction, a cam follower in the form of a ball rotatably mounted in said eccentric cam, an inclined camming surface rigidly formed on the drive shaft and coacting with the cam follower, a spring biasing said eccentric cam so as to maintain contact between the cam follower and camming surface, a rotatable actuator located remotely from said mounting bracket and means operatively connecting said actuator to said drive shaft so that rotation of said actuator in one direction causes said means formed on said shaft to rotate said eccentric cam through the resilient tooth to turn the yoke member and mirror support solely about said first pivot axis, and rotation of said actuator in an opposite direction causes said stop means to engage the eccentric cam and restrain turning movement thereof whereby the camming surface turns so as to displace the eccentric cam along the drive shaft and pivot the yoke and mirror support solely about said second axis.

9. A remotely controlled mirror mechanism comprising a mounting bracket, a mirror support, first means supporting said mirror support and connected to said mounting bracket for movement about mutually perpendicular first and second axes, a drive means rotatably supported in said mounting bracket, second means engaging the drive means so as to prevent axial movement thereof, third means connected to said drive means for rotating the latter, fourth means connecting said drive means with said first means so that rotation of said drive means in one direction moves said mirror support solely about said first axis while rotation of said drive means in the opposite direction moves said mirror support solely about said second axis.

10. The device of claim 9 wherein said fourth means comprises a first member rigidly secured to said drive means, a second member, a one-way clutching arrangement connecting said second member to said drive means and limiting rotation of the second member to one direction so that rotation of said drive means in said one direction causes said first and second members to rotate at the same rate to pivot said mirror support solely about said first axis while rotation of said drive means in an opposite direction causes said first member to rotate relative to said second member to pivot said mirror support solely about said second axis.

11. The device of claim 10 wherein said first member includes a camming surface, and a cam follower on said second member engaging said camming surface.

References Cited by the Examiner

UNITED STATES PATENTS

| | | |
|---|---|---|
| 1,491,937 | Walker | Apr. 29, 1924 |
| 1,588,832 | Young | June 15, 1926 |
| 1,718,421 | Koca et al. | June 25, 1929 |
| 2,614,437 | Meggitt | Oct. 21, 1952 |
| 2,919,599 | Milton et al. | Jan. 5, 1960 |
| 3,000,263 | Milton et al. | Sept. 19, 1961 |